No. 896,587. PATENTED AUG. 18, 1908.
O. SAUGSTAD.
REGULATOR.
APPLICATION FILED DEC. 9, 1904.
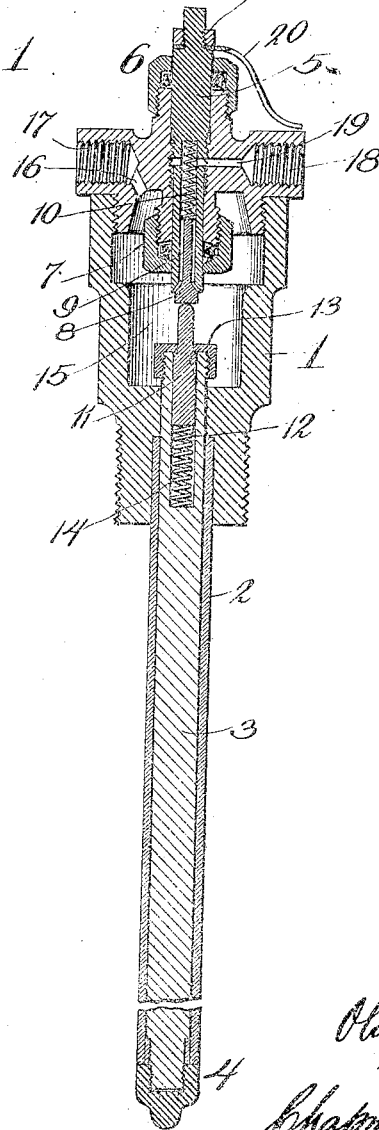

UNITED STATES PATENT OFFICE.

OLAF SAUGSTAD, OF PLAINFIELD, NEW JERSEY, ASSIGNOR, BY MESNE ASSIGNMENTS, TO H. & M. AUTOMATIC REGULATOR COMPANY, A CORPORATION OF NEW YORK.

REGULATOR.

No. 896,587.   Specification of Letters Patent.   Patented Aug. 18, 1908.

Application filed December 9, 1904. Serial No. 236,112.

*To all whom it may concern:*

Be it known that I, OLAF SAUGSTAD, a citizen of the United States of America, and resident of Plainfield, county of Union, and State of New Jersey, have invented certain new and useful Improvements in Regulators, of which the following is a specification, reference being had to the accompanying drawings, forming a part thereof.

My invention relates to improvements in regulators and particularly to improvements in thermostatic regulators of the type employed for hot water regulation.

My invention consists in certain novel details of construction and combination of parts as will hereinafter be more fully pointed out.

In order that my invention may be clearly understood, I will describe an embodiment thereof with reference to the accompanying drawings illustrating same, and will then point out the novel features in claims.

In the drawings: Figure 1 is a view in central longitudinal section through a regulator embodying my invention, and Fig. 2 is an end view of same.

The device comprises a casing 1, to which is attached one end of a tube 2. A rod 3 is arranged within the tube, and is secured thereto at the outer end 4 thereof. The connection is a rigid one unyieldingly connecting the rod and tube together at this end, but the said rod and tube are composed of materials having different coefficients of expansion, and are permitted relative longitudinal expansion and contraction whereby their inner ends, or that end opposite to the end 4, may move with relation to each other.

A valve seat 5 is mounted in the casing 1 in a line with the thermostatic tube and rod 2 and 3. This valve seat being mounted in the casing, is held relatively stationary with respect to the end of the tube 2 during the normal operation of the device, but the connection between the valve seat 5 and casing 1 is preferably an adjustable one, whereby manual adjustment thereof may be obtained when desired. For this purpose I preferably screw-thread the valve seat into place in the casing, as shown, and, in order to secure a tight joint between the valve seat and casing, I provide two stuffing boxes 6 and 7, one without and the other within the casing, as shown.

The valve seat 5 carries a valve 8, the stem 9 of which is received within a hollow portion of the said seat. The valve 8 is permitted to move longitudinally, a spring 10 exerting force in a direction to move the valve away from its seat. The rod 3 is provided at its inner end with an operating plug 11, the outer end of which abuts against the outer face of the valve 8. The plug 11 is mounted in a hollow portion 12 of the rod 3, and the outer movement thereof is limited by means of a head or cap 13, which engages a shouldered portion of the said plug. A spring 14 bears against the plug and normally tends to force same outward. The force exerted by the spring 14 is greater than the force exerted by the spring 10, so that, when the two springs are opposed, the spring 10 will be compressed to the fullest extent permitted by the parts, before the spring 14 begins to compress.

The casing 1 is hollow, the interior thereof forming a chamber 15, in open communication through a passage 16 with a connection 17 arranged to connect with a source of supply of fluid pressure. An oppositely arranged connection 18 connects through a passage 19, through the valve seat and past the valve face into the said chamber 15 when the valve is open, and is closed from such communication when the said valve is closed. The valve seat at its outer end carries a pointer 20 rigidly secured thereto by means of a nut 21, the said pointer arranged to indicate the adjustment given to the valve seat.

In operation, the device is suitably mounted with the thermostatic member immersed in the fluid intended to be regulated, which may for instance be water. The connection 17 will be connected with a supply of fluid pressure, and the connection 18 with an operating device for controlling the heat of the fluid in which the thermostat is immersed, as aforesaid. The valve seat will be adjusted so that the thermostat will operate at the desired temperature, and when the temperature falls below this point the greater contraction of the tube with respect to the bar 3 will cause the valve seat to be drawn toward the operating plug 11 carried by the free end of the rod 3 until the valve is forced to its seat. This will prevent motive fluid passing the valve seat from the connection 17 to the connection 18, and the operating device (not shown) will be relieved of fluid pressure, and will be caused in any well known manner to admit heat to raise the temperature of the fluid regulated. As the temperature of the fluid in which the thermostat is immersed rises above the predetermined point, the parts will move relatively in an opposite direction, the operating plug 14 being drawn away from the valve and the valve permitted to open under tension of the spring 10. Fluid under pressure will then be admitted through the connection 17, past the face of the valve 8 to the connections 18, and thence to the heat controller so as to close the admission of heat.

Should the temperature of the fluid in which the thermostat is immersed fall considerably below the point at which the device is set for closing the valve, further relative contraction between the thermostatic members will take place and the plug 11 will be forced into the recess 12 against the pressure of the spring 14. The pressure of the spring 14 will, however, tend to keep the valve firmly to its seat, but will relieve undue pressure upon the parts due to this excessive change of temperature.

What I claim is:

1. In a regulator, the combination with two thermostatic members comprising a tube and a bar unyieldingly connected together at one end, said tube and bar arranged one within the other, and composed of materials having different coefficients of expansion, of a valve seat secured stationary with respect to said tube, a valve fitted to said seat, an operating member carried by the said thermostatic bar, said operating member yieldingly supported in said bar but limited in its outward movement with respect thereto, and opposing springs for said valve and said operating member respectively, the spring for said operating member being arranged to exert a force greater than the force exerted by the spring for said valve.

2. In a regulator, the combination with two thermostatic members comprising a tube and a bar connected together unyieldingly at one end, said tube and bar arranged one within the other and composed of materials having different coefficients of expansion, of a casing to which the free end of the said tube is secured, a valve seat adjustably mounted in said casing and projecting from the exterior to the interior thereof, a valve mounted to move longitudinally in said valve seat, an operating plug mounted in said thermostatic bar in a line with said valve and adapted to abut against same, opposing springs for said operating plug and said valve, tending to move them toward each other, the spring for said operating plug exerting a greater force than the force exerted by the spring for said valve, and means for limiting the outward movement of said operating plug.

3. In a regulator, the combination with a casing, a thermostatic tube secured thereto, a bar arranged within the tube and secured unyieldingly thereto at its outer end, an operating member yieldingly supported in said bar, but limited in its outward movement with respect thereto, a plug mounted in said casing in a line with said thermostatic members, said plug having a screw-threaded connection therewith whereby it may be adjusted toward and away from said operating member, and provided with a valve seat, a valve mounted in said plug and carried thereby, said valve arranged for coaction with said valve seat, a spring housed within said plug and arranged to force said valve away from its seat, said spring opposing, but overbalanced by, the force of said operating member under the influence of its yielding movements.

OLAF SAUGSTAD.

Witnesses:
JOSEPH T. WADSWORTH,
D. HOWARD HAYWOOD.